US006817528B2

(12) United States Patent
Chen

(10) Patent No.: US 6,817,528 B2
(45) Date of Patent: Nov. 16, 2004

(54) REFLECTIVE APPARATUS AND METHOD FOR OPTICALLY SENSING RELATIVE TORQUE EMPLOYING MOIRÈ FRINGES

(75) Inventor: Bo Su Chen, Garland, TX (US)

(73) Assignee: Honeywell International Inc., Morristown, NJ (US)

( * ) Notice: Subject to any disclaimer, the term of this patent is extended or adjusted under 35 U.S.C. 154(b) by 297 days.

(21) Appl. No.: 09/907,363

(22) Filed: Jul. 17, 2001

(65) Prior Publication Data

US 2003/0015590 A1 Jan. 23, 2003

(51) Int. Cl.[7] .............................................. G06K 15/00
(52) U.S. Cl. ........................... 235/462.13; 235/462.01; 235/454; 235/470; 356/618; 73/862.324; 702/43; 250/231.16
(58) Field of Search ........................... 235/454, 462.01, 235/462.13, 470, 494; 356/35.5, 616, 618, 385; 73/800, 862.321, 862.324, 862.325, 862.326, 862.237; 702/41, 42, 43; 250/231.1, 231.13, 231.16

(56) References Cited

U.S. PATENT DOCUMENTS

| | | | | |
|---|---|---|---|---|
| 3,194,065 | A | * 7/1965 | Wilson | ................... 73/862.327 |
| 3,688,570 | A | * 9/1972 | Burke, Jr. | ............... 73/862.321 |
| 4,037,157 | A | 7/1977 | Campbell | |
| 4,179,685 | A | 12/1979 | O'Maley | |
| 4,221,963 | A | 9/1980 | Fushimi | |
| 4,432,239 | A | 2/1984 | Bykov | |
| 4,433,585 | A | 2/1984 | Levine | |
| 4,459,487 | A | 7/1984 | Leser | |
| 4,509,075 | A | 4/1985 | Simms et al. | |
| 4,525,068 | A | 6/1985 | Mannava et al. | |
| 4,641,027 | A | * 2/1987 | Renner et al. | ......... 73/862.324 |
| 4,767,925 | A | 8/1988 | Kawamoto | |

(List continued on next page.)

FOREIGN PATENT DOCUMENTS

| | | |
|---|---|---|
| DE | 44 04 483 A1 | 8/1995 |
| DE | 197 38 965 A1 * | 3/1998 |
| WO | 88 00745 A | 1/1988 |
| WO | WO 99/39169 A1 * | 8/1999 |

OTHER PUBLICATIONS

Robert D. McConnell, "A Noncontact Magnetoelastic Torque Transducer," *Sensors* magazine article, Nov. 1990, pp. 37–40.
Joseph W. Goodman, "Fresnel Diffraction by a Sinusoidal Amplitude Grating—Talbot Images", excerpt, © 1996, 1998, pp. 87–89, *Introduction to Fourier Optics*, second edition, McGraw–Hill, USA, no month.
Michael G. Sheldrick, "Interest in Misfire Detection Technology Grows," *Automotive Electronics Journal*, © Nov. 6, 1989, p. 12, Fairchild Publications.
K. Patorski, *The Handbook of the Moirè Fringe Technique*, table of contents pp. xiv—xix, 1993, Elsevier Science Publishers, Amsterdam, The Netherlands, no month.

*Primary Examiner*—Jared J. Fureman
(74) *Attorney, Agent, or Firm*—Andrew A. Abeyta; Ortiz & Lopez, PLLC

(57) ABSTRACT

Systems and methods analyze the performance of a mechanical system having two identical rotating members therein. Light is directed from two identical light sources to intercept encoded portions of the rotating members. A portion of the light is reflected from the encoded portions of each rotating member. The reflected portion of the light can be then detected to recover performance data maintained therein, wherein the performance data contains performance characteristics of the mechanical system. A reflected portion of the light can be detected to recover performance data. The light sources can be configured as Vertical Cavity Surface Emitting Lasers (VCSEL). The encoded portions of rotating members thereof can include a bar code. Images from a first encoded surface may interact with an image from a second encoded surface after the light beams are reflected off the first and second rotating surfaces to produce Moirè fringes.

15 Claims, 6 Drawing Sheets

U.S. PATENT DOCUMENTS

| | | | |
|---|---|---|---|
| 4,850,693 A | * 7/1989 | Deason et al. | 356/35.5 |
| 4,900,913 A | 2/1990 | Muro | |
| 4,939,368 A | 7/1990 | Brown | |
| 5,001,937 A | 3/1991 | Bechtel et al. | |
| 5,038,616 A | * 8/1991 | Schneider et al. | 73/660 |
| 5,166,741 A | 11/1992 | Gempe et al. | |
| 5,253,531 A | * 10/1993 | Walker et al. | 73/650 |
| 5,266,810 A | 11/1993 | Murphy | |
| 5,382,785 A | 1/1995 | Rink | |
| 5,635,724 A | 6/1997 | Higgins | |
| 5,793,485 A | 8/1998 | Gourley | |
| 5,835,613 A | 11/1998 | Breed et al. | |
| 5,866,915 A | 2/1999 | Pryor et al. | |
| 6,089,455 A | * 7/2000 | Yagita | 235/454 |
| 6,091,504 A | 7/2000 | Walker et al. | |
| 6,115,111 A | 9/2000 | Korah et al. | |
| 6,203,985 B1 | 3/2001 | Jiang et al. | |
| 6,285,024 B1 | * 9/2001 | Pinnock | 250/231.13 |
| 6,288,644 B1 | 9/2001 | Mathews et al. | |
| 6,313,460 B1 | 11/2001 | Haas et al. | |
| 6,316,763 B1 | 11/2001 | Appleyard et al. | |
| 6,353,502 B1 | 3/2002 | Marchant et al. | |
| 6,399,940 B1 | * 6/2002 | Cui et al. | 250/231.13 |
| 6,460,422 B1 | * 10/2002 | Kuroda et al. | 73/862.324 |
| RE37,969 E | * 1/2003 | Horton et al. | 250/231.13 |
| 6,586,719 B1 | * 7/2003 | Bartzke et al. | 250/221 |
| 6,635,863 B1 | * 10/2003 | Nihommori et al. | 250/231.13 |
| 6,639,207 B2 | * 10/2003 | Yamamoto et al. | 250/231.14 |
| 6,666,375 B1 | * 12/2003 | Harriman et al. | 235/454 |
| 6,679,126 B2 | * 1/2004 | Dalton et al. | 73/862.324 |
| 2003/0010137 A1 | * 1/2003 | Dalton et al. | 73/862.324 |
| 2003/0015591 A1 | 1/2003 | Chen | |
| 2003/0138020 A1 | * 7/2003 | Chen | 372/75 |
| 2003/0145663 A1 | * 8/2003 | Heisenberg et al. | 73/862.324 |
| 2003/0218126 A1 | * 11/2003 | Shiba | 250/231.13 |
| 2004/0007663 A1 | * 1/2004 | Steinlechner et al. | 250/231.16 |

* cited by examiner

REFLECTIVE APPARATUS AND METHOD FOR OPTICALLY SENSING RELATIVE TORQUE EMPLOYING MOIRE FRINGES

RELATED APPLICATION

This application is related to co-pending and co-owned application entitled: "Transmissive Apparatus and Method for Optically Sensing Relative Torque Employing Moirè Fringes" filed on even date herewith.

FIELD OF THE INVENTION

The present invention is generally related to measuring methods and systems. The present invention is also related to optical measuring methods and systems. In addition, the present invention is related to methods and systems for measuring the angular displacement and relative torque between two rotating shafts. The present invention is additionally related to non-invasive optical measuring techniques. The present invention is also related to optically sensing techniques for measuring relative mechanical characteristics between rotating members within a mechanical system.

BACKGROUND OF THE INVENTION

Torque Sensors

A variety of techniques for measuring torque in mechanical systems have been attempted. To date, however, none of these techniques have been completely satisfactory. Several methods of measuring torque within a shaft, strain or optical gauge have been described in the literature. As explained herein, such measuring techniques are generally limited in their scope and applications and are inherently unreliable in both their efficiency and accuracy.

Torque can be measured in a shaft by bonding strain gauges in a cross arrangement along helical lines of compression and tension. The strain gauges can be electronically configured via a balance-bridge and coupled to measuring electronics through slip rings or non-contacting rotary transformers. Generally, these cross arrangements are difficult to implement and usually require custom installation.

In optical torque transducers, light beams, code patterns and light sensors convert the differential angular displacement between two positions on a shaft into an output signal, due to applied torque. Specifically, identical patterns made of light reflecting strips can be arranged around the circumference of the shaft at two locations. The patterns may be illuminated by laser diodes and the reflected light sensed by a photocell. The output of each photocell can be configured as a pulse train wherein the phase difference is a measure of the torque. In a similar device, which is taught by Kawamoto, U.S. Pat. No. 4,767,925, *Optical Type Relative Rotation Measurement Apparatus*, a pair of light emitting and receiving elements produces an output dependent on the amount of light transmitted due to the relative rotation of two slotted disks. Levine, U.S. Pat. No. 4,433,585, *Device for Measurement of the Torsional Angular Deviation of a Loaded Rotating or Static Shaft*, discloses a technique for passing a beam of light through two diffraction gratings placed at different locations along a shaft and sensing the phase of the two resulting beams. Such techniques and devices thereof are not robust because they require precise alignment for optimal functioning.

U.S. Pat. No. 5,001,937, *Optically Based Torsion Sensor* to Bechtel et al., discloses an optically based torsion sensor that measures the phase displacement between two bands of alternating high and low reflectivity regions. A major drawback of this device is its dependence on the initial alignment of the two bands. In addition, minor differences in the rise time of detecting electronics will cause serious errors in measurement. U.S. Pat. No. 4,525,068, *Torque Measurement Method and Apparatus* to Mannava et al., discloses a torque sensor utilizing optical Doppler measurements. Since Doppler measures velocity only, this device suffers from a serious shortcoming in that it must infer torque from changes in instantaneous rotational velocity of two different sections of a shaft.

Two optical methods for measuring the strain of an object are noteworthy. U.S. Pat. No. 4,939,368, *Polychromatic Optical Strain Gauge*, to Brown, discloses an optical grating to measure strain in a stationary object. The device is complicated in that it requires two frequencies of light and has no provision for measuring a moving object such as a rotating shaft. U.S. Pat. No. 4,432,239, *Apparatus for Measuring Deformation*, to Bykov, discloses an apparatus for measuring the deformation of an object. The device utilizes an electro-optical frequency modulator to produce two components from an incident laser beam. A polarization splitter further splits the light into two different frequencies, which illuminate a diffraction grating on a stationary object. This device is also complicated and expensive and has no provision for measurement of a moving object such as a rotating shaft.

The literature discloses a capacitive torque sensor consisting of two encoders either mounted perpendicular to the shaft at each end or mounted along the circumference at two closely placed points along the shaft. For example, see *Interest in Misfire Detection Technology Grows*, Automotive Electronics Journal, Nov. 6, 1989, pg 12. Each encoder has two parts: a stator that consists of up to 256 radial fingers that are alternately charged; and a rotor that is generally mounted on the shaft. As the shaft turns, the rotor's potential switches between positive and negative at a frequency proportional to speed. A disk, at the center of the stator, electrically isolated from the charged fingers, collects the signal. Like the optical torque sensor, the twist of the shaft is determined by measuring the phase difference between the two encoders. Also, like the optical sensor, this device requires precise alignment.

Finally, magnetic torque sensors comprise much of the prior art. The magnetic properties of most ferromagnetic materials change with the application of stress to such an extent that stress may be ranked with field strength and temperature as one of the primary factors affecting magnetic charge. Magnetostriction is a measure of the stress sensitivity of a material's magnetic properties. Magnetic-based torque sensors take advantage of the magnetostrictive properties of ferromagnetic metals, such as carbon steel. See *Noncontact Magnetic Torque Transducer*, Sensors, November 1990, pp. 37–40. These sensors make a contact-less measurement of changes of magnetic permeability in shaft materials, which are caused by torsional stress.

In place of strain gauges, magnetic flux is directed into the shaft and along the helical lines of compression and tension. A positive magnetostriction shaft experiencing torsion will exhibit increased permeability along the line of tension and decreased permeability along the line of compression. At low stress levels the permeability is nearly linear with stress but varies dramatically at high stress. Another drawback of a magnetostrictive torque sensor is in the need for calibrating it individually with each shaft. This requirement is obvious because the torque measurement is made by means of the magnetostrictive properties of the shaft material and cannot be predetermined in the manufacture of the sensor by itself.

The variability in magnetostrictive properties is usually correlated with the variability of the mechanical hardness of the material. Hardness variability of shaft materials typically ranges from +10% to +40%. The shaft-to-shaft variability problem has been addressed in recent research by adding either a sleeve or coating of a well-defined and magnetically soft material, such as nickel, permalloy, or ferromagnetic amorphous alloys. While this approach shows promise, installation can not be made in situ, and all magnetic materials, even the softest, can retain some magnetism, leading to non-linearities and drift.

Each of the above-mentioned techniques for measuring torque falls short of the ideal due to a variety of shortcomings, which include high cost, inadequate resolution and sensitivity, extreme dependence on precise alignment, inability to be applied in situ, or susceptibility to environmental conditions. Therefore, there exists a need for an economical, accurate, simple, non-contact sensor for the measurement of relative torque.

Moirè Fringes and Talbot Self-Image Effect

When electromagnetic rays, including light rays, are impinged and reflected off a pattern contained within an encoded surface, such as a diffraction grating, a bar code or a grooved surface, the reflected rays form an image of the pattern of the encoded surface. When such reflected electromagnetic rays from two such encoded surfaces are subsequently made to overlap, or interact, the resulting pattern is a super-position of the two simple harmonic functions. In classical optics such patterns are generally known as Talbot interferograms, Fresnel patterns or Moirè fringes. See *The Handbook of the Moirè Fringe Technique*, K. Patorskii (1993). Similarly, Moirè fringes and Talbot self-image effect could be observed when a single beam of light is transmitted through two gratings, or bar codes, placed serially with respect to one another. For detailed mathematical theory on the formation and the Talbot self-image effect see *Introduction to Fourier Optics*, by J. W. Goodman, $2^{nd}$ Ed., pgs 87–89.

Moirè fringes and the Talbot self-image effect have hitherto been used effectively in a multitude of applications, including anti-counterfeiting devices, determination of optical characteristics of manufactured lenses, calibration of screen printing devices, etc. A review of the literature reveals that Moirè fringes and the Talbot self-image effect have hitherto not been applied to sensors for the measurement of the relative torque between two rotating shafts.

SUMMARY

One aspect of the present invention provides for a measuring method and apparatus.

Another aspect of the present invention provides for an optical measuring method and apparatus.

A further aspect of the present invention provides for a method and apparatus for measuring the angular displacement and relative torque between two rotating shafts.

An additional aspect of the present invention provides optically sensing techniques for measuring relative mechanical characteristics between rotating members within a mechanical system.

An additional aspect of the present invention provides for the utilization of vertical cavity surface-emitting laser (VCSEL) diodes.

The above and other aspects of the present invention are achieved as is now described. An optical angular displacement sensor may be utilized to measure rotary displacement between two shafts that rotate together. By connecting the shafts together utilizing a torsion bar, the sensor may be used to measure transmitted torque. The sensor generally comprises first and second coaxial discs mounted on shafts, which have encoded surfaces adhered (for example, as a vernier) along their circumferential edges. The encoded surfaces are adhered to the disks in such a way that they are parallel to each other. The apparatus operates by reflecting two beams of light over the encoded surfaces adhered to the circumferential edges of the two mounted disks on the rotating shafts.

The light beam may be incident upon the encoded surface of the first rotating disk at a small angle of incidence. Similarly, a second light beam, identical to the first light beam, may be incident upon the encoded surface of the second rotating disk. The image of the encoded pattern from the reflected beam of light from the first disk interacts with the image of the encoded pattern of the second disk as the second beam is reflected off the second encoded surface. By virtue of the design of the encoded surfaces, the reflected beams of light form Moirè fringes that are dynamically stable when the two rotating shafts rotate synchronously.

When the rotating shafts rotate asynchronously, the Moirè fringes exhibit motion that may be detected. The detected signal can be analyzed to yield a variety of relative mechanical characteristics of the rotating shafts, including the relative torque between the shafts. Contrast within the Moirè fringes may be significantly improved by placing the detector at the Talbot distance.

In addition to measuring angular displacement and torque, the apparatus can also be configured to measure performance characteristics such as relative spring and damping coefficients, relative slip and friction, or relative uniformity of motion between the rotating shafts. The apparatus can also be used to determine the direction of rotation and extent of linear motion between the rotating shafts. Finally, the apparatus and method disclosed herein according to the present invention can be utilized to provide feedback to the mechanical system to improve performance and reliability.

DESCRIPTION OF PREFERRED EMBODIMENTS

Figure 1:
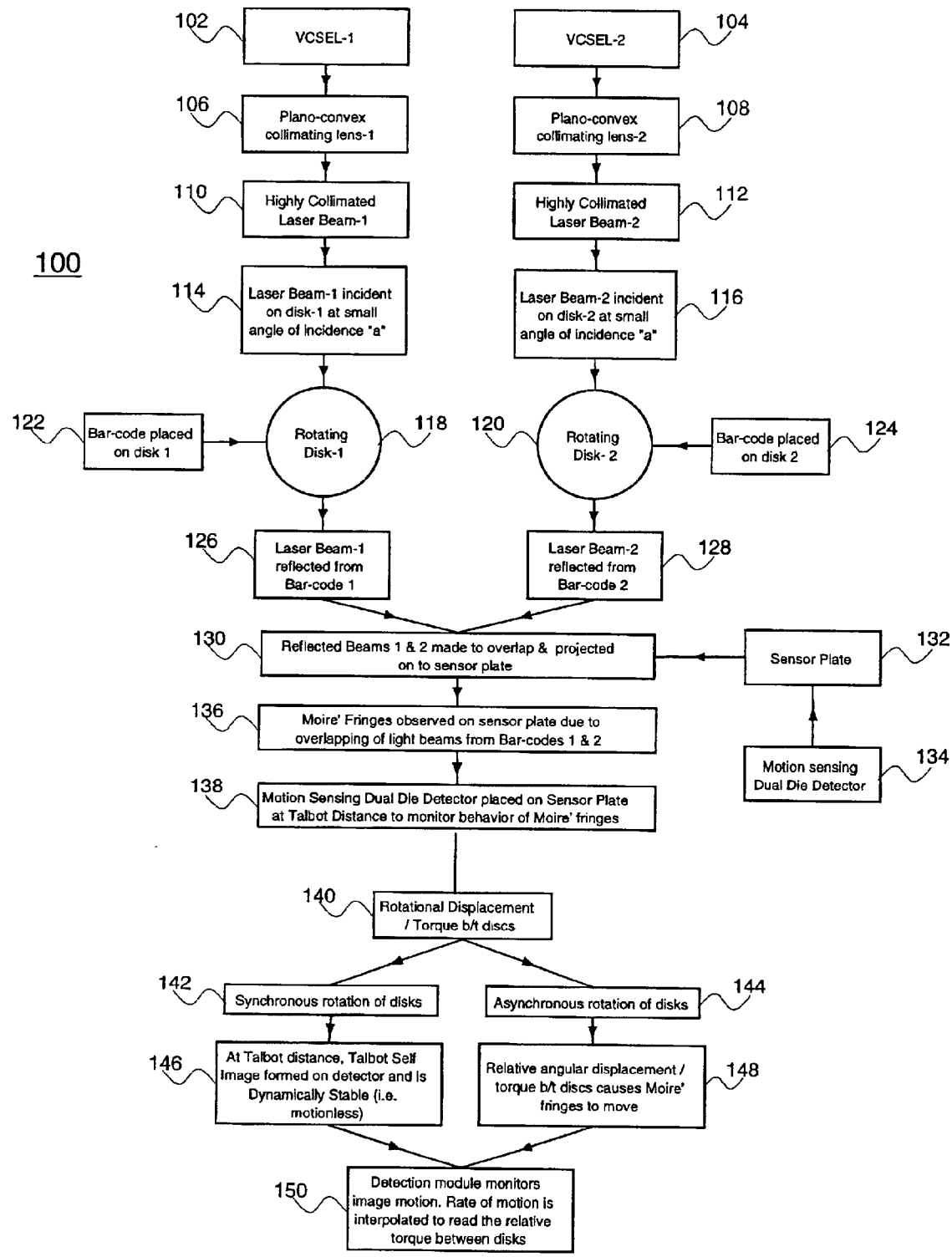
FIG. 1 illustrates a flow diagram illustrating basic operations of an optical torque sensor, in accordance with a preferred embodiment of the present invention.

Referring to FIG. 1, a flow diagram 100 illustrating basic functional operations of an optical torque sensor in a reflective configuration is illustrated, in accordance with a preferred embodiment of the present invention. The optical torque sensor referred to in the flow diagram of FIG. 1 relies on the formation of Moirè fringes to detect relative torque. Such an optical sensor also relies on the Talbot self-image effect. Those skilled in the art will appreciate that the flow diagram illustrated in FIG. 1 provides general operational steps in accordance with the present invention. It is anticipated that a thorough understanding of the invention may be realized by referring to the other figures presented herein.

Thus, as illustrated at blocks 102 and 104, two vertical cavity surface emitting laser (VCSEL) units are the source of two identical beams of uncollimated laser light. The VCSEL is one type of light source that can be utilized in accordance with the present invention. Other types of light sources can also be utilized in accordance with the present invention. For example, the light source may be configured as other types of lasers, including an edge emitting laser, a light-emitting diode, or an incandescent lamp. The uncollimated laser light can be emitted in the form of an uncollimated laser beam. As depicted at blocks 106 and 108, the uncollimated laser beams pass through convex lenses, which render the laser beams highly parallel, i.e. collimated, as illustrated thereafter at blocks 110 and 112. Thus, light beams from the VCSEL units are rendered highly collimated by the convex lenses before the light beams intercept the encoded portions of first and second rotating members (e.g., rotating disks) in accordance with the present invention. Additionally, optical wedges, or prisms, can be placed behind the convex lenses to deflect the two collimated beams of light at the appropriate angle, to the rotating disks, if necessary.

As described next at blocks 114 and 116, the collimated laser beams are incident on first 118 and second 120 rotating disks each at a small angle of incidence "a". As depicted at blocks 114 and 116, the collimated laser beams can be incident simultaneously on disks 118 and disk 120. As indicated at block 122, an encoded pattern such as a bar-code was previously placed on the rotating disk 118 (i.e., the first rotating disk) along its circumferential edge. Likewise, as illustrated at block 124, an encoded pattern such as a bar code was previously placed on the rotating disk 120 (i.e., the second disk) along its circumferential edge. Such bar codes may together form a dual layer bar code. Those skilled in the art can appreciate that the rotating disks discussed herein represent one form of a rotating member that may be utilized in accordance with the present invention. Other types of rotating members may also be utilized in accordance with the present invention. Examples of such a rotating member include a gear, a shaft, a linkage, etc.

As indicated at block 2126, the laser beam 110 is reflected off disk 118, and the reflected beam carries with it an image of the encoded surface from disk 1. Similarly, as indicated at block 128, the laser beam 112 is reflected off disk 120, and the reflected beam carries with it an image of the encoded surface from disk 2. The two beams are incident on the rotating disks in such a way that the reflected beams from the rotating disks overlap with each other. In the region of overlap the image of the first bar code interacts with the image of the second bar code. As illustrated next at block 130 the reflected and overlapping images are projected onto a sensor plate. As illustrated next at block 136, Moirè fringes can be observed on the sensor plate due to the reflected light beams emitted from first and second encoded surfaces associated respectively with the first and second disks described above. Thereafter, as depicted at block 138, a motion sensing dual die detector is placed on the sensor plate at a Talbot distance to monitor the behavior of the Moirè fringes. As indicated at block 134 and 132, however, a motion sensing detector (preferably dual die detector) can be previously linked to the sensor plate.

Two possible paths of operational behavior are encountered at this point in the process. As illustrated at block 140, rotational displacement (i.e., angular displacement) and torque may be evidenced between the rotating disks. Either synchronous or asynchronous rotation of the disks may be evidenced, as indicated at blocks 142 and 144, respectively.

If synchronous rotation between the rotating disks is evidenced, as indicated at block 142, then as indicated at block 146, at the Talbot distance, a Talbot self-image is formed on the motion sensing detector, indicating dynamic stability (i.e., motionless). The detection module can then monitor image motion, as illustrated at block 150. The detection module may be configured to translate motion within the Moirè fringes into angular displacement between the rotating disks, which in turn may be interpolated to provide a measurement of the relative torque between the disks. Note that the detection module may also be referred to as a "detector mechanism" or a "detection mechanism."

If asynchronous motion of the disks is evidenced, as indicated at block 144, then, as illustrated thereafter at block 148, the relative angular displacement and/or torque between the disks will cause the Moirè fringes to move. Thereafter, as described at block 150, the detection module monitors image motion. The rate of motion of the Moirè fringes may be extrapolated by the detection module to read the relative torque between the disks.

Figure 2:
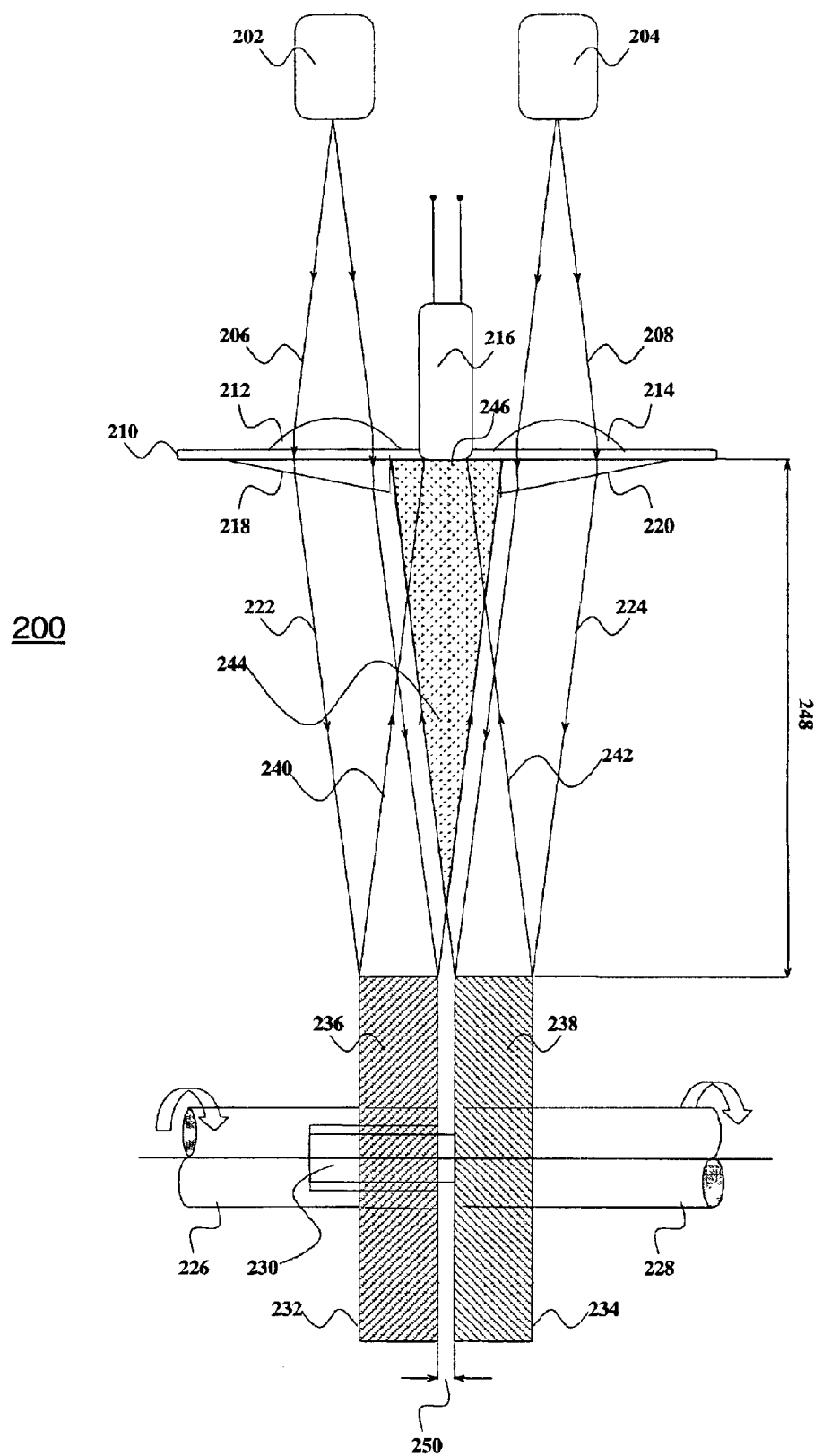
FIG. 2 depicts a side sectional view of an optical torque sensor, in accordance with a preferred embodiment of the present invention.

FIG. 2 depicts a side sectional view 200 of an optical torque sensor, in accordance with a preferred embodiment of the present invention. According to FIG. 2, two vertical cavity surface emitting laser (VCSEL) units 202 and 204 are the source of two uncollimated laser light beams 206 and 208. The uncollimated laser light beams 206 and 208 are passed through convex lenses 212 and 214, which render the laser beams highly parallel (i.e., collimated as shown by beams 222 and 224). After passing through the convex lenses 212 and 214, the collimated light beams may be passed through two optical wedges, or prisms, 218 and 220 in order to deflect the collimated light beams to the rotating disks at the appropriate angle as illustrated in FIG. 2. Alternatively, the VCSEL units 202 and 204 may themselves be placed at the appropriate angle instead of using the optical wedges 218 and 220.

The appropriately deflected collimated light beams 222 and 224 can then impinge on two rotating disks 232, 234 at a small angle of incidence "a". The angle of incidence is generally half the angle formed between the incident beam 222 and its reflected beam 240. Similarly, the angle of incidence "a" may be identical to the angle formed between beams 224 and its reflected beam 242. In a preferred embodiment of the present invention, an input shaft 226 and an output shaft 228 are coupled together via a torsion bar 230 that may be mounted coaxially (i.e., along the central axis of the mechanical system) and between the input and output shafts as illustrated in FIG. 2. Torque and rotational forces are transmitted from the input shaft 226 through the torsion bar 230 to the output shaft 228. Rotating disk 232 may be coaxially aligned and mounted at the end of the torque transmitting input shaft 226 and facing rotating disk 234. Rotating disk 234 may be coaxially aligned and mounted at the end of the torque receiving output shaft 228 and facing rotating disk 232. The axes of rotation for the disks 232 and 234 are generally co-linear with the axes of rotation of the input and output shafts. As illustrated in FIG.

2, rotating disks 232 and 234 may be separated by a small gap 250 of, for example, between two and ten millimeters. Rotating disks 232 and 234 can be connected via springs or some other connection (not shown).

In a preferred embodiment of the present invention, each of the rotating disks 232 and 234 have respective identical bar codes 236 and 238 applied along their circumferential edges as illustrated in FIG. 2.

To achieve the formation of Moirè fringes, the collimated laser light beams from light beams 222 and 224 impinge on rotating disks 232 and 234. The laser beam 222 may be incident on disk 232 at a small angle of incidence "a" and reflected on to the sensor plate 210 to form an image of encoded pattern 236 on the sensor plate 210. Similarly, the laser beam 224 may be incident on disk 234 at a small angle of incidence "a" and reflected on to the sensor plate 210 to form an image of encoded pattern 238 on the sensor plate 210. As illustrated in FIG. 2, the reflected beams 240 and 242 overlap (reference numeral 244) as they are projected on to the sensor plate 210. The encoded patterns within the reflected beams 240 and 242 then interact to form Moirè fringes on sensor plate 210. The sensor plate 210 is preferably placed at the Talbot distance 248 from the point where the beam of reflected light leaves the surface of the encoded surface 236 or 238. When the distance between the point of origination of the reflected beams 240 or 242 from the encoded surfaces 236 or 238 and the sensor plate 210 is about equal to the Talbot distance 248, exact replicas of bar codes 236 and 238 may be observed on sensor plate 210. This type of image is called a Talbot self-image. The Talbot distance in the above embodiment is mathematically represented by the following equation:

$$Z = 2nL^2/\lambda \quad \text{(Eq. 1)}$$

where
  z is the Talbot distance;
  n is an integer;
  L is the pitch of the bar codes, and;
  $\lambda$ is the wave length of the light beam.

Thus, for example, for a bar code with 300 lines per inch, the pitch P is equal to 169.3 microns. If the incident light beam has a wave length $\lambda$ of 850 nanometers, and n is assumed to be 1, then the Talbot distance is equal to 1.6867 centimeters.

The Talbot self-image effect increases the contrast of the Moirè fringes. Such an increase in contrast improves the resolution, thereby enabling better and more efficient detection. In a preferred embodiment of the present invention, a detector 216 can be a dual die photo detector that measures the intensity of the light patterns that are incident upon it. Therefore, in the preferred embodiment, it is preferable to maximize the intensity of the Moirè fringes and Talbot self-image. The mathematical relationship for the intensity distribution of Talbot self-image effect is represented as follows:

$$I(x,y) = 1/4[1 + 2m\cos(\pi\lambda z/L^2)\cos(\pi\lambda x/L) + m^2\cos^2(\pi\lambda x/L)] \quad \text{(Eq. 2)}$$

where
  x,y,z represent the three Cartesian coordinates. The distance z represents the distance 248 between the point of origination of each of the reflected beams 240 and 242 and the sensor plate 210. The x and y coordinates represent the two dimensional plane of the sensor plate 210 where the Moirè fringes are projected;

m is the modulation coefficient. When m=1, maximum modulation occurs;
  L is the period of the lines on the encoded surfaces 236 and 238, which are identical; and,
  $\lambda$ is the wavelength of the light beam.

The intensity, or conversely the contrast, of the Moirè fringes could be determined for different values for z. As previously stated, the mathematical equation for z at the Talbot distance is $z = 2nL^2/\lambda$, where n is an integer. When this value of z is incorporated into the intensity distribution equation (2), it is thus reduced to the following:

$$I(x,y) = 1/4[1 + 2m\cos(\pi\lambda x/L) + m^2\cos^2(\pi\lambda x/L)]$$

or, when m=1;

$$I(x,y) = 1/4[1 + 2\cos(\pi\lambda x/L) + \cos^2(\pi\lambda x/L)] \quad \text{(Eq. 3)}.$$

At a distance that is greater than the Talbot distance, at say, $z = (2n+1)L^2/\lambda$, the intensity distribution equation (2) is thus reduced to the following:

$$I(x,y) = 1/4[1 - 2m\cos(\pi\lambda x/L) + m^2\cos^2(\pi\lambda x/L)]$$

or, when m=1;

$$I(x,y) = 1/4[1 - 2\cos(\pi\lambda x/L) + \cos^2(\pi\lambda x/L)] \quad \text{(Eq. 4)}.$$

At a distance that is less than the Talbot distance, at say $z = (n-1/2)L^2/\lambda$, the intensity distribution equation (2) is thus reduced to the following:

$$I(x,y) = 1/4[1 + m^2\cos^2(\pi\lambda x/L)]$$

or, when m=1

$$I(x,y) = 1/4[1 + \cos^2(\pi\lambda x/L)] \quad \text{(Eq. 5)}.$$

Those skilled in the art can appreciate that by solving equations (3), (4) and (5) by including the empirical values for the various variables in these equations, the intensity distribution is the maximum for equation (3), i.e., at the Talbot distance. Therefore, at the Talbot distance 248, exact replicas of the two encoded surfaces 236 and 238 are formed on the sensor plate 210 that are of the greatest intensity possible. This feature of the preferred embodiment improves the resolution, and at the same time decreases the demand for high resolution optics.

It is noteworthy that the Moirè fringes and Talbot self-image effect are observed in all modes of operation of the mechanical system (i.e., when both shafts are stationary, or when both shafts rotate either synchronously or asynchronously). Preferably, when no torque is applied between the input and output shafts 226 and 228, the Moirè fringes that are formed remain dynamically stable, i.e., without any motion. When torque is applied between input and output shafts 226 and 228, the torsion bar 230 is subject to torsional forces that cause the input end to have a certain angular displacement relative to the output end of the torsion bar 230. This in turn causes a relative angular displacement between disks 232 and 234. When the relative rotation between disks 232 and 234 is asynchronous, Moirè fringes are formed that move parallel to the plane of rotation. The direction of motion of the Moirè fringes is dependent upon the direction of rotation of the shafts. When the direction of motion reverses, the Moirè fringes move in the opposite direction.

In a preferred embodiment, any motion of the Moirè fringes is monitored by detection module 216, which preferably is a dual die detector. Additionally, the direction of motion of the Moirè fringes is dependent upon the displacement between the disks 232 and 234. Therefore, detection module 216 can also be configured to detect the direction in which the torque may be applied as well as angular displacement. Also, if one of the disks 232 or 234 is fixed (i.e., held stationary), detection module 216 can be utilized to measure the rate of rotation of the other.

Additionally, the Talbot self-image may be formed by interaction of the images of the bar codes from all of the elements from bar codes 236 and 238, and the Moirè pattern thus formed is a combination effect created by all elements of the Talbot self-images. Thus, the output from detection module 216 is not sensitive to changes from local defects on the surface of the encoded surfaces. Had the performance of the sensor been susceptible to minor defects in the encoded surfaces, expensive enveloping apparatus would have been required to safeguard against any damage to the encoded surfaces. The relative insensitivity to minor defects in the encoded surfaces makes the apparatus more robust and further reduces the cost of the apparatus.

Those skilled in the art can appreciate that the spacing between the two detection components of the dual die detector can be designed in a manner that introduces a phase shift (e.g., 90°). This phase shift can be introduced by the spacing utilized to detect the direction of motion of the Moirè fringes. Detection module 216 may be programmed to interpolate the motion within the Moirè fringes into angular displacement between disks 232 and 234, which in turn may provide a measurement for the relative torque between the disks 232 and 234. In the preferred embodiment, photo detectors commonly used in the art have been employed and are, therefore, not described in detail herein.

Figure 3:
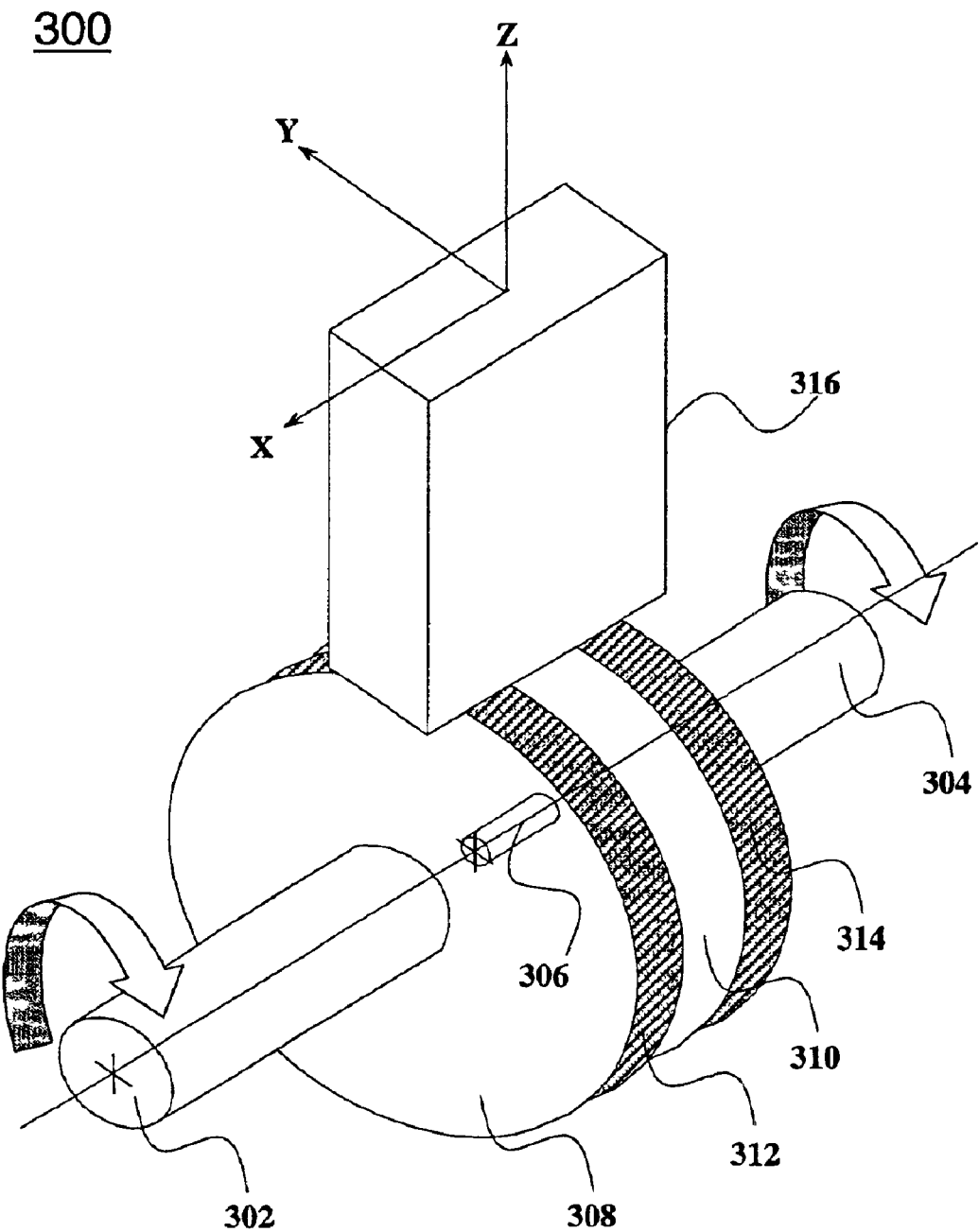
FIG. 3 illustrates an overall schematic layout of the optical torque sensor illustrated in FIG. 2, in accordance with a preferred embodiment of the present invention.

FIG. 3 illustrates an overall schematic layout 300 of an optical torque sensor, in accordance with a preferred embodiment of the present invention.

Torque from the input shaft 302 is transmitted to the output shaft 304 through the torsion bar 306. The rotating disks 308 and 310 are attached to the facing ends of the input and output shafts 302 and 304. The two rotating disks are separated by a small distance. The housing of the light source and the detection module are illustrated in the housing module 316. Because the bar codes 312 and 314 are relatively insensitive to minor defects or damage, the housing does not have to be air tight, thereby reducing both the cost of fabrication and maintenance of the apparatus.

Figure 4:
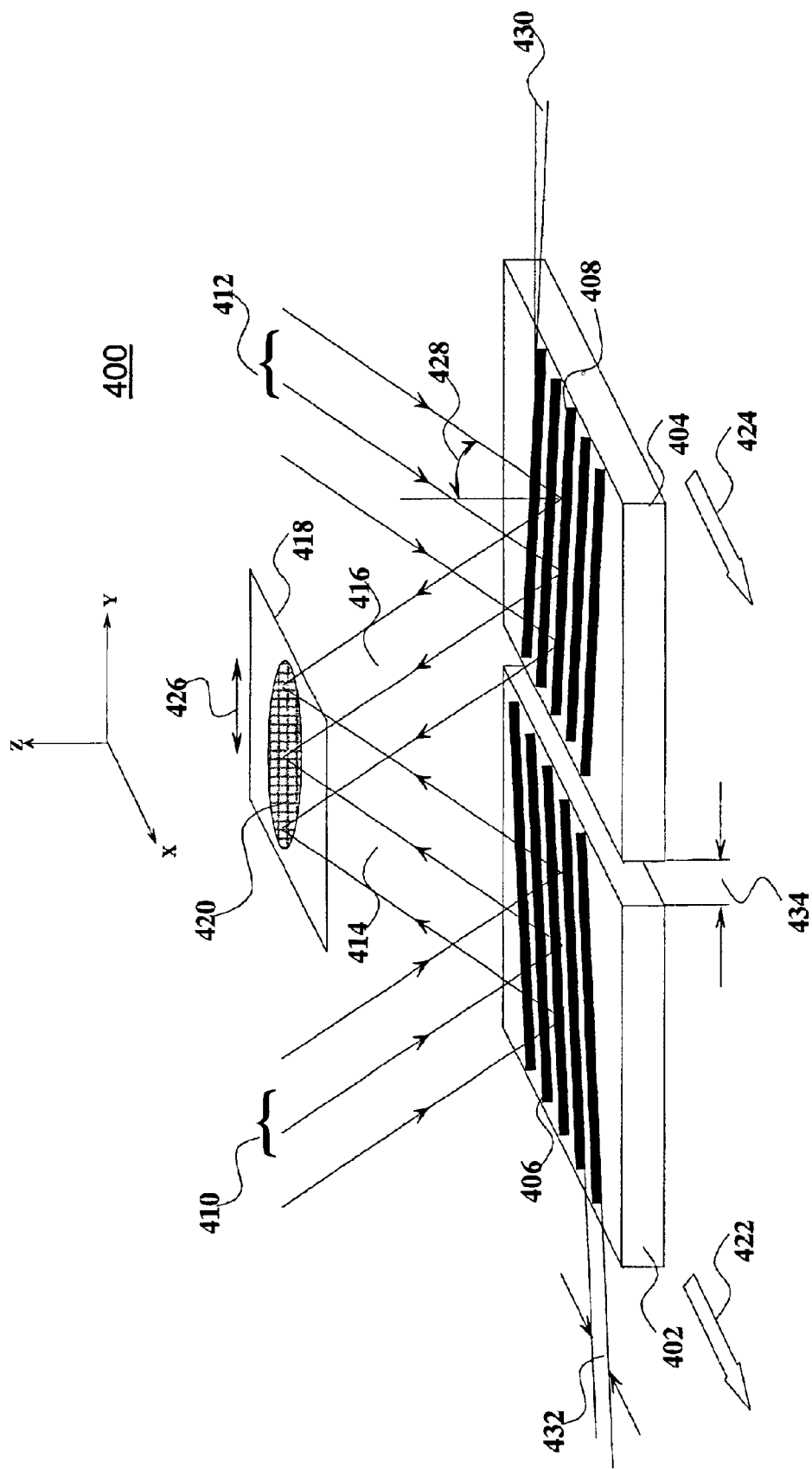
FIG. 4 is a diagram illustrating the functioning of encoded surfaces for the generation of Moirè fringes, in accordance with a preferred embodiment of the present invention.

FIG. 4 is a diagram 400 illustrating functioning of the encoded surfaces in accordance with a preferred embodiment of the present invention. A magnified view of the rotating disks is depicted by elements 402 and 404. For the sake of simplicity, the magnified views of the rotating disks depicted by elements 402 and 404 are illustrated without any curvature. The encoded surface 406 is adhered to the face of rotating disk 402. Similarly, the encoded surface 408 is adhered to the face of the rotating disk 404.

In bar code 406, the combined width of one opaque line of bar code and one transparent region between successive opaque lines is the pitch of the bar code as represented by 432. The lines of bar code of each of the encoded surfaces 406 and 408 are set at a small angle with respect to the circumferential edges of the rotating disks 402 and 404. This angle can be the angle at which the individual lines of bar code within the two reflected images interact with each other. This angle is the angle of interaction "a". In FIG. 4, the angle of the lines of the bar codes with respect to the circumferential edges of disk 404 is represented by 430. This angle can be half the interaction angle. The sum of the angle from bar code 406 and 408 constitutes the interaction angle "a".

The collimated laser beam 410 is reflected off the encoded surface 406 on disk 402. The light beam 414 carries an image of the bar code 406 as it is reflected off the encoded surface 406. Similarly, the collimated laser beam 412 is reflected off the encoded surface 408 on disk 404. The light beam 416 carries an image of the bar code 408 as it is reflected off the encoded surface 408.

The reflected beams 414 and 416 are projected on to the sensor plate 418. The images of the bar codes 406 and 408 contained in the reflected light beams 414 and 416 interact to form Moirè fringes 420 that are observed on the sensor plate 418.

The rotating disks 402 and 404 rotate in the direction indicated by arrows 422 and 424. If the rotating disks 402 and 404 are both stationary, or both rotating synchronously, the Moirè fringes 420 remain stable (i.e., motionless). If the rotation of the disks 402 and 404 is asynchronous, the Moirè fringes 420 begin to move in the direction shown by arrows 426.

Figure 5:
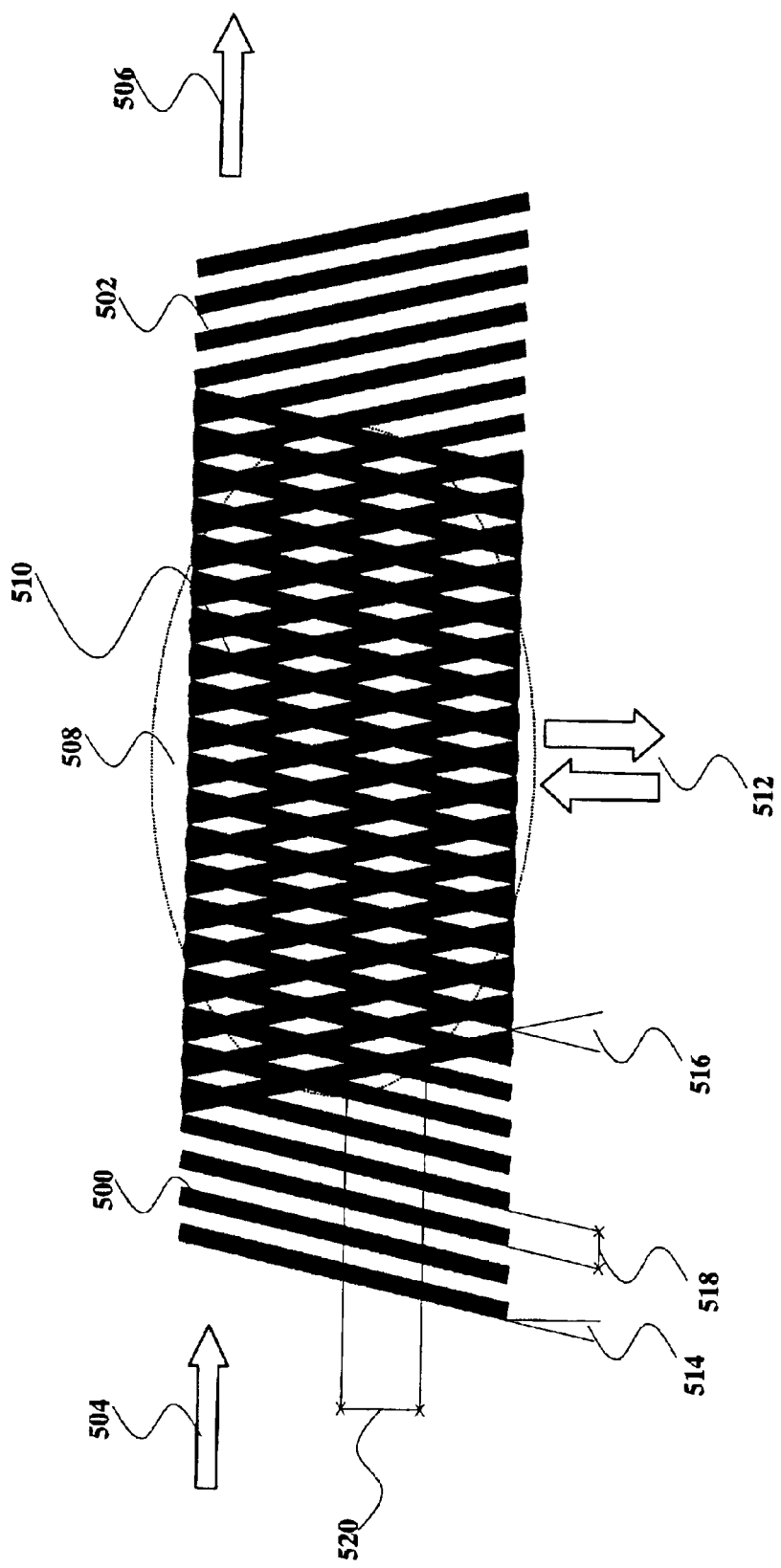
FIG. 5 depicts a diagram illustrating the formation of Moirè fringes, in accordance with a preferred embodiment of the present invention.

FIG. 5 depicts a diagram illustrating the formation of Moirè fringes, in accordance with a preferred embodiment of the present invention. The image of the bar code 500 from disk one interacts with the image of the bar code 502 to form Moirè fringes 510 in the region 508 where the two images overlap. The width of one line of bar code and the transparent area is the pitch "p" of the bar code 500 as represented by 518. The lines of the bar codes 500 and 502 interact with each other at a small angle of interaction "a" as represented by 516.

The direction of the motion of the images 500 and 502 are represented by arrows 504 and 506, respectively. When the relative motion between 504 and 506 is synchronous, the fringes 510 remain stable (i.e., motionless). When the relative motion between 504 and 506 is asynchronous, the Moirè fringes begin to move as represented by arrows 512.

The interaction between bar code images 500 and 502 results in the formation of Moirè fringes 510. The fringes form repeating lines and have a pitch Pm as represented by 520 in the figure. The mathematical relationship between the pitch of the bar codes and the pitch of the Moirè fringes is represented by the following equation:

$$P_m = \frac{P}{2\mathrm{Sin}(a/2)} \tag{Eq. 6}$$

where
  $P_m$ is the pitch of Moirè fringes;
  P is the pitch of bar codes; and,
  a is the angle of interaction.

As a further enhancement of the concepts discussed above, Moirè fringes can also be observed by mismatch when there is a slight difference in the pitch between the two bar codes 500 and 502. The resulting Moirè fringes are represented by the following equation:

$$P_m = (P_1 * P_2)/(P_2 - P_1) \tag{Eq. 7}$$

where,
  $P_m$ is the pitch of the Moirè fringes; and,
  $P_1$ and $P_2$ respectively represent the non identical pitches of the bar-codes 500 and 502.

Figure 6:
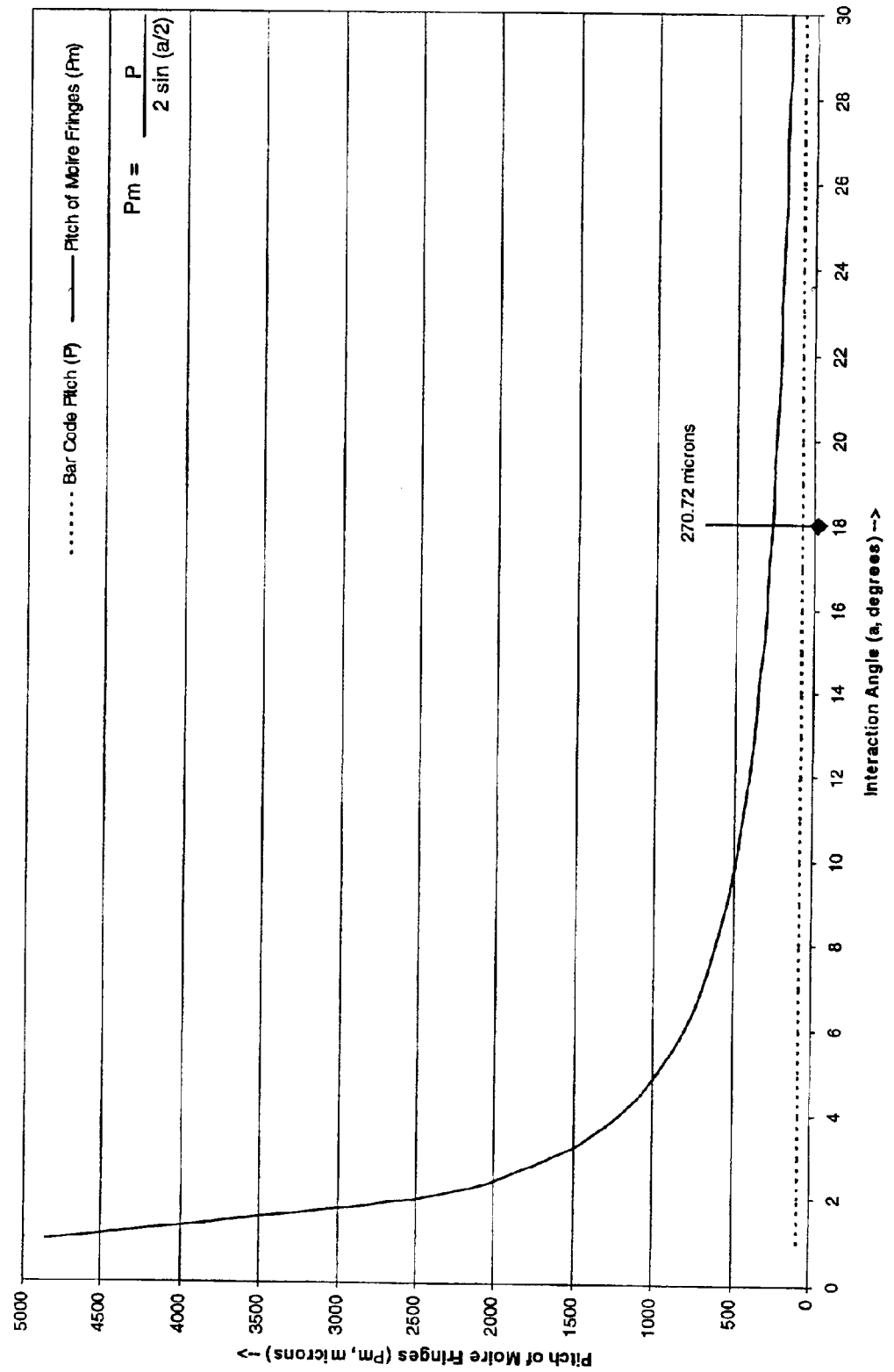
FIG. 6 is a graphical illustration of the relationship between the interaction angle of the bar codes of encoded surfaces and the pitch of Moirè fringes.

FIG. 6 illustrates a graphical representation of the relationship between the angle of interaction and the pitch of the Moirè fringes. The Moirè effect amplifies the shift dimension by a factor of $P_m/P$, where P and $P_m$ are the pitches of the scale and the Moirè fringes. The graph in FIG. 6 shows the pitch of the Moirè fringes as a function of the angle of interaction. By way of illustration, if the angle of interaction is, for example, 18°, and 2 identical bar codes of 300 lines per inch, i.e., at a pitch of 85 microns, are used, then the pitch of the resulting Moirè fringes would be 271 microns. The shift dimension is represented as follows:

$$S = \frac{P_m}{P} \tag{8}$$

Therefore, for the above example the shift dimension would be 3.2. In other words, the pitch of the Moirè fringes that are formed are 3.2 times greater in pitch than the bar codes. This factor can reduce the demand on high-resolution optics and increase the measuring resolution. Additionally, it can be appreciated that one pitch in the bar code can results in one pitch of movement in the Moirè fringes.

As illustrated in FIG. 6, the pitch of the Moirè fringes $P_m$ increases as the angle of interaction "a" decreases. Those skilled in the art can appreciate that the sensitivity and resolution of measurement of the device improves as the value of the angle of interaction decreases. This is because the smaller the angle of interaction, the greater the magnification of the pitch of the Moirè fringes. However, at extremely small angles of interaction, the device is also extremely sensitive to any deviations from the predetermined (i.e., by virtue of the design of the device) angle of interaction. Small deviations in the angle of interaction may easily be introduced by unavoidable conditions, such as vibrations or slight misalignment of the rotating disks, thereby causing unacceptably large errors in the measurement of relative torque. Therefore, the benefits of high resolution and sensitivity must be weighed against the reliability, economy and robustness of the device.

As is evident in FIG. 6, at larger angles of interaction, the size of the Moirè fringes is relatively smaller. However, even at larger angles of interaction (e.g., 18°) the magnification of the Moirè fringes may be sufficient for easy detection. Additionally, as depicted in FIG. 6, the curve is relatively flat at larger angles of interaction, indicating that the size of the Moirè fringes remains relatively stable over small changes in the angle of interaction. Therefore, the adverse effects due to the anomalies introduced by vibration or slight misalignment between the disks may be overcome by designing an embodiment of the present invention with an appropriate angle of interaction, while preserving the required sensitivity, reliability and cost of the device.

The embodiments and examples set forth herein are presented in order to best explain the present invention and its practical applications and to thereby enable those skilled in the art to make and utilize the invention. Those skilled in the art can recognize that the foregoing description and examples have been presented for the purposes of illustration and example only. Thus, the description as set forth herein is not intended to be exhaustive nor to limit the invention to the precise form disclosed. Many modifications and variations are possible in light of the above teaching without departing from the spirit and scope of the following claims.

What is claimed is:

1. An apparatus for detecting the relative motion between two rotating members in a mechanical system, comprising:
    two identical lasers for generating two identical light beams;
    at least one first reflector located on a first rotating member positioned such that the reflection of a first light beam provided from a first of said two identical lasers forms an encoded portion of said first rotating member;
    at least one second reflector located on a second rotating member positioned such that the reflection of a second light beam provided from a second of said two identical lasers forms an encoded portion of said second rotating member; and
    one detector that detects Moirè fringes formed as a result of the interaction of images from said first and second encoded portions of said first and second rotating members, wherein said detector is located proximate to said mechanical system.

2. The apparatus of claim 1 further comprising:
    a sensor that analyzes a signal from said detection mechanism, thereby monitoring motion associated with said Moirè fringes, wherein said sensor is located proximate to said mechanical system.

3. The apparatus of claim 2 further comprising:
    at least two collimating lenses located in an optical path of said mechanical system, wherein said collimating lenses render said light beams from said light sources into highly collimated parallel light beams; and
    at least two optical elements that operate on said light beams after passing through said at least two collimating lenses, thereby directing said light beams to intercept said encoded portions on said first and second rotating members.

4. The apparatus of claim 1 wherein light beams from said two Vertical Cavity Surface-Emitting Laser (VCSEL) units are rendered highly collimated by convex collimating lenses before said light beams intercept encoded portions of said first and second rotating members.

5. The apparatus of claim 4 wherein said encoded portions comprise:
    a transparent polymer film having parallel lines of opaque bar code imprinted on an upper surface of said transparent polymer film; and
    wherein said parallel lines are spaced evenly, thereby forming a gap therebetween, wherein a width associated with said gap is identical to a width of said parallel lines, such that said transparent polymer film is adhesively attached to a rotating member; and
    wherein said parallel lines are positioned at angle in relation to an axis of rotation of said rotating members.

6. The apparatus of claim 5 wherein:
    said transparent polymer film comprises a bar code when adhered to a rotating disk; and
    wherein said bar code is adhered along a circumferential edge of said rotating member.

7. The apparatus of claim 1 wherein:
    said first light beam intercepts said first encoded portion of said first rotating member at an angle of incidence of "a"; and
    said second light beam, identical to said first light beam, intercepts said second encoded portion of said second rotating member at an angle of incidence of "a";
    wherein said first light beam carries an image of a first bar code supported by said first encoded portion after being reflected from said first encoded portion of said first rotating member; and
    wherein said second light beam carries an image of a second bar code supported by said second encoded portion after being reflected off said second encoded portion of said second rotating member.

8. The apparatus of claim 7 wherein the image from said first encoded surface interacts with the image of said second encoded surface after said light beams are reflected off said first and second rotating surfaces to produce Moirè fringes.

9. The apparatus of claim 8 wherein Moirè fringes are observed on a sensor plate.

10. The apparatus of claim 9 wherein said sensor plate is located at a Talbot distance from a point where said reflected light beams originate from said encoded surface of said first and second rotating members.

11. The apparatus of claim 9 wherein said detector is located on said sensor plate.

12. The apparatus of claim 1 wherein said encoded portion of said rotating member is shaped to increase said reflected light in a particular direction.

13. The apparatus of claim 1 wherein said encoded portion of a rotating member is shaped to form an optical encoder for encoding data representing performance characteristics of said mechanical system.

14. The apparatus of claim 1 wherein said encoded portion of a rotating member is provided as a vernier on said rotating member to increase accuracy for sensing motion thereof.

15. The apparatus of claim 1 wherein said encoded portion of said rotating member comprises measuring features recessed into a surface or edge of said rotating member.

* * * * *